Sept. 15, 1964 J. COLOVER 3,149,069
MEANS FOR CONCENTRATING LIQUIDS
Filed Nov. 17, 1960

INVENTOR:
JACK COLOVER
BY Bailey, Stephens & Huettig
ATTORNEYS

United States Patent Office 3,149,069
Patented Sept. 15, 1964

3,149,069
MEANS FOR CONCENTRATING LIQUIDS
Jack Colover, London, England, assignor to National Research Development Corporation, London, England, a British corporation
Filed Nov. 17, 1960, Ser. No. 69,943
Claims priority, application Great Britain, Nov. 20, 1959, 39,382/59; July 26, 1960, 25,992/60
4 Claims. (Cl. 210—91)

The present invention concerns means for concentrating liquids by removal of a solvent or diluent constituent, for example water, and has for an object to provide a construction which is simple to make and use and which can be employed for the concentration of very small quantities of liquid in such a way that drying-out of the liquid is minimised and the final volume of concentrate can be predetermined.

According to the present invention means for concentrating a liquid comprises a reservoir having a cover through which projects a tube whose lower end is closed by a permeable membrane and accurately located at a distance above the bottom of the reservoir such that the membrane initially makes contact with a pool of the liquid to be concentrated in the reservoir.

Preferably, the bottom of the reservoir is concave and symmetrical about the centre-line of the tube, and it may further be provided with an annular depression or groove to ensure the retention of at least a minimum quantity of liquid after concentration.

Advantageously, the reservoir and tube are enclosed in a fluid tight casing adapted to prevent loss by evaporation of the liquid to be concentrated.

Conveniently, the permeable membrane is stretched over the lower end of the tube in such a manner as to be flat and free from creases, and may be preformed as a cap to fit snugly over the tube and or may be formed in situ from a sheet of regenerated cellulose which is stretched taut over the lower end of the tube until all creases are removed. The remainder of the sheet may then be clipped around the tube, and the latter inserted through the cover so as to form a substantially vapour-tight seal.

The invention may be applied to the dialysis or desalting of small quantities of liquid, care being exercised in the choice of a material for the membrane which is inert to the substances being used. However, one important use of the concentration device according to the present invention is the concentration of very small quantities—say, one millilitre or less—of biological fluids such as cerebrospinal or ventricular fluids for diagnostic purposes.

Practical embodiments of the invention will now be described, by way of example only, with reference to the accompanying drawings in which.

Figure 1:
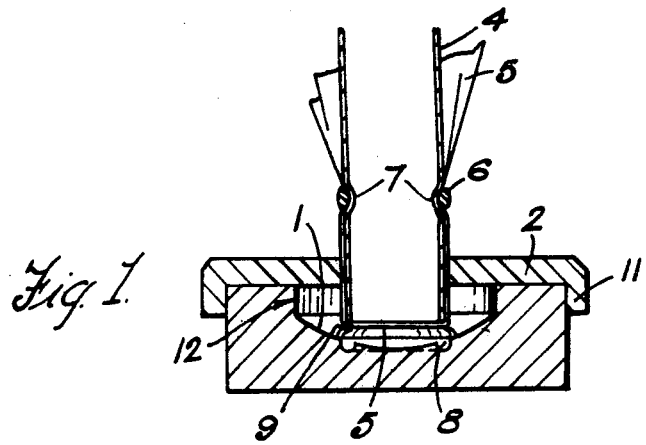
FIGURE 1 is an axial section through a first embodiment.

Referring first to FIGURE 1 of the drawings, a concentration cell for cerebrospinal or ventricular fluids comprises a shallow reservoir or lower chamber 1 formed of a block of chemically inert material such as glass, synthetic resin, stainless steel, or the like and normally closed by a cover plate 2. The reservoir or chamber 1 is of generally part-spherical shape symmetrical about a central vertical axis.

The cover plate 2 has an aperture 3 to receive a short tube 4 coaxial with the chamber 1.

A sheet 5 of regenerated cellulose material is stretched tightly over the bottom end of the tube 4 and smoothed around the tube wall whereby the tube passes in a vapor tight manner through the aperture 3. Above the aperture, the remainder of the sheet is firmly clipped to the tube, as by a spring retaining band or ring 6 which registers with a shallow circumferential groove 7 in the tube wall.

Both the reservoir or chamber 1 and the cover plate 2 are circular in plan, and the cover plate has a depending flange 11 of accurately controlled depth which is a snug fit over the rim of the reservoir 1.

Coaxially with the tube 4, the bottom of the reservoir or chamber 1 is shown formed with an annular groove 8 of about the same diameter as the tube 4. The lower end of the tube 4 projects below the underside of the cover 2 to within an accurately predetermined distance of the bottom of the chamber. This distance is conveniently preset by first placing the cover 2 on a flat rigid base such as a glass or smooth metal plate, and pushing the lower end of the tube 4 through the aperture 3 until it rests on the surface of the base plate.

Figure 2:
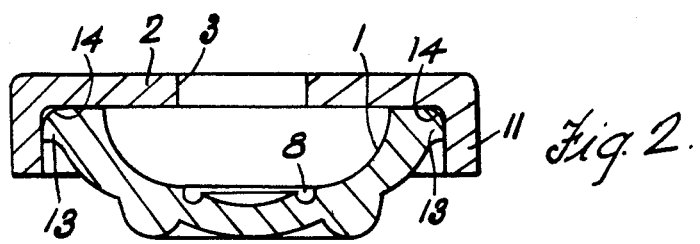
FIGURE 2 shows a modified form of reservoir.

The chamber 1 of FIGURE 1 has its generally part-spherical floor surmounted by a cylindrical side wall 12, but in the modification shown in FIGURE 2 this side wall blends smoothly into the floor, whilst the reservoir 1 has an external lip 13 the top surface of which is radiused, as shown at 14, around its periphery to ensure accurate seating of the cover 2 on the top surface.

In one practical design of cell according to FIGURE 1 or 2, the reservoir 1 has an overall diameter of 2.2 cm. whilst the groove 8 has an external diameter of 1.2 cm., an internal diameter of 1.0 cm. and a depth of 0.5 mm. The side wall 12 of FIGURE 1 is 6 mm. in depth, and the flange 11 is 6.25 mm. in height. The above dimensions are appropriate to the concentration of 0.5 ml.–1 ml. of cerebrospinal fluid using a dialysis liquid in the tube 4 consisting of a 30% w./w. aqueous solution of a polyethylene glycol such as that known as Carbowax 20 M. The residual volume of concentrate is of the order of 0.005–0.020 ml.

Figure 3:
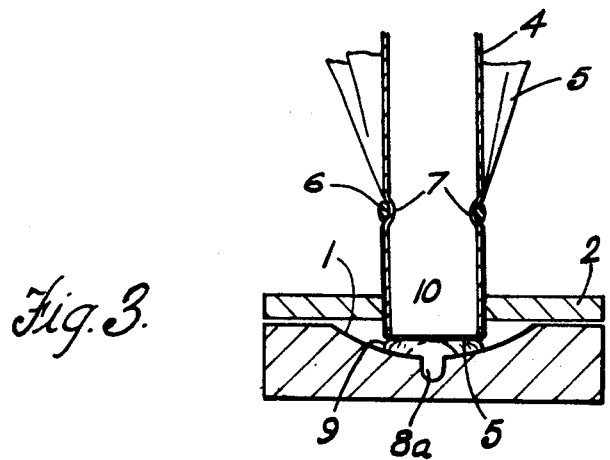
FIGURE 3 is a view similar to FIGURE 1 of a second embodiment.

In the modification shown in FIGURE 3, where like parts carry the same reference numerals, the cover plate 2 is flat, and the projection of the dialysis tube 4 is determined by placing the cover on a gauge ring of appropriate height on a flat base. The groove 8 is also replaced by a central well 8a. For an initial volume of fluid of about 0.250 ml. which is to be concentrated down to a residual volume of 0.015–0.020 ml., the capacity of the well 8a is about 0.01 ml. and the accuracy of projection of the tube 4 through the cover 2 must be kept to within 0.25 mm.

The cell is used as follows:

Before the cover 2 is placed in position, the sample volume of aqueous solution liquid 9 is introduced into the reservoir 1. The cover, with its membrane-carrying dialysis tube being pre-adjusted with a substantially liquid tight seal, is then placed in position so that a relatively large surface area of the liquid 9 is in contact with the membrane. A predetermined volume of aqueous polyethylene glycol is placed in the tube 4, this volume being selected according to the required degree of concentration of the sample liquid 9. Water in the sample passes through the membrane 5 until the volume of the sample 9 is reduced to the required concentration. This may be made to coincide with the point at which the meniscus at the free surface of the sample breaks away from the membrane (seen best in dotted line at 10 in FIG. 3), thus automatically stopping any further concentration.

Quite unexpectedly, it has been found that the most-concentrated part of the liquid remaining in the chamber 1 at the conclusion of the dialysis of protein-containing fluids, e.g. cerebrospinal fluid, tends to collect in the form of a ring more or less symmetrically disposed about the central axis of the chamber. Hence the provision of the groove 8 in FIGURES 1 and 2 in the floor of the chamber ensures that this concentrated residue is collected with the minimum risk of drying-out which would affect the properties of the components of the residue. As described, above, the optimum position of the groove which has been found most suitable is such that it corresponds substantially to the vertical projection of the bottom of the dialysis tube 4 onto the floor of the chamber, although some small variation about this position may be tolerated depending upon the volume of liquid it is desired to collect.

The apparatus may be used with advantage to concentrate small volumes of solution, e.g. of the order of a few millilitres or fractions of a millilitre, containing substances whose properties are altered in some respects on complete drying-out of the solution, protein-bearing liquids being especially notable. In such cases, the provision of a closed chamber is necessary to minimise evaporation and ensure proper control of the degree of concentration. It is also important that the liquid makes no contact during dialysis with any other surface than the membrane 5 and the walls and floor of the chamber 1; the taut flat surface of the membrane 5 is also highly important in this respect, to avoid creases or crevices in which material may lodge.

In order to ensure that the volume of the liquid sample 9 is not affected by evaporation, the entire cell may be placed in a vapour-tight casing (not shown) the humidity of the atmosphere within the casing being carefully controlled. This is particularly important for certain diagnostic purposes, such as the determination of protein content of the sample by electrophoresis, to prevent structural break-down of the proteins.

A concentration cell according to the present invention enables very small quantities of liquid to be concentrated, and is relatively cheap and easy to manufacture, and enables a relatively cheap membrane material to be used. Furthermore, it materially reduces the skill hitherto required in a technician to concentrate very small quantities of liquid.

Instead of stretching a sheet 5 of membrane material over the lower end of the tube 4, preformed caps may be provided. These have the advantage that no creases or folds are present which would encourage deposition of protein on the surface of the membrane.

Where the sample is a liquid requiring desalting, the membrane 5 is of a material which is pervious to electrolytes but not to water.

The cover 2 may be clamped to the reservoir block or they may be wrung together, as preferred. The block may constitute the base of a vapour-tight casing.

I claim:

1. A concentration cell comprising a generally concave reservoir for a liquid to be concentrated; a cover closing said reservoir; a substantially rigid tube passing downward through said cover; a substantially liquid tight seal being between the tube and the cover; a permeable dialyzing membrane being flat across and closing the lower end of the tube; means for securing the membrane to the tube; the lower end of said tube being a predetermined distance from the floor of said reservoir; the floor of said reservoir having a concentric depression, the surfaces of said reservoir and depression being concentric about a center axis passing through the tube and reservoir.

2. A concentration cell as in claim 1 wherein said concentric depression is a shallow annular groove, the mean diameter of which is about equal to the diameter of the said tube.

3. A concentration cell as in claim 1 wherein said concentric depression is a central well wherein the axis of the well is the same as said central axis passing through said tube and said reservoir.

4. A concentration cell comprising a generally concave reservoir for a liquid to be concentrated; a cover closing said reservoir; a substantially rigid tube passing downward through said cover; a substantially liquid tight seal being between the tube and the cover; a permeable dialyzing membrane being flat across and closing the lower end of the tube; means for securing the membrane to the tube; the lower end of said tube being a predetermined distance from the floor of the reservoir, and gauge means for setting said predetermined distance consisting of a flange on the rim of said cover, the internal height of the flange being equal to the distance the lower end of said tube must extend below said cover.

References Cited in the file of this patent

UNITED STATES PATENTS 2,692,854     Henley _____ Oct. 26, 1954
2,985,587     Hoch et al. _____ May 23, 1961